United States Patent [19]

Dei et al.

[11] Patent Number: 4,805,013

[45] Date of Patent: Feb. 14, 1989

[54] IMAGE DATA CONVERSION SYSTEM

[75] Inventors: Katsuhito Dei, Tokyo; Yoshinobu Mita, Kawasaki; Tadashi Yoshida, Ichikawa; Naoto Kawamura, Yokohama, all of Japan

[73] Assignee: Canon Kabushiki Kaisha, Tokyo, Japan

[21] Appl. No.: 183,300

[22] Filed: Apr. 11, 1988

Related U.S. Application Data

[63] Continuation of Ser. No. 770,770, Aug. 29, 1985.

[30] Foreign Application Priority Data

| Sep. 5, 1984 | [JP] | Japan | 59-184684 |
| Sep. 5, 1984 | [JP] | Japan | 59-184685 |
| Sep. 5, 1984 | [JP] | Japan | 59-184686 |

[51] Int. Cl.$^4$ .............................................. G03F 3/08
[52] U.S. Cl. ...................................... 358/80; 358/32; 358/164
[58] Field of Search ................... 358/80, 78, 76, 32, 358/164, 280; 340/703

[56] References Cited

U.S. PATENT DOCUMENTS

| 4,032,969 | 6/1977 | Ueda | 358/80 |
| 4,346,402 | 8/1982 | Pugsley | 358/80 |
| 4,410,909 | 10/1983 | Ueda et al. | 358/80 X |
| 4,415,923 | 11/1983 | Noda | 358/32 X |
| 4,467,364 | 8/1984 | Konagaya | 358/280 |
| 4,472,736 | 9/1984 | Ushio et al. | 358/75 |
| 4,476,487 | 10/1984 | Klie et al. | 358/78 X |
| 4,477,833 | 10/1984 | Clark et al. | 358/78 X |
| 4,499,494 | 2/1985 | Dischert et al. | 358/32 |
| 4,590,515 | 5/1986 | Wellendorf | 358/80 X |
| 4,598,282 | 7/1986 | Pugsley | 358/76 X |
| 4,639,770 | 1/1987 | Jung | 258/76 |

Primary Examiner—James J. Groody
Assistant Examiner—Victor R. Kostak
Attorney, Agent, or Firm—Fitzpatrick, Cella, Harper & Scinto

[57] ABSTRACT

An image data conversion system has a RAM for storing a data conversion table, a CPU for calculating the data conversion table by parameters received from a ROM, input devices for supplying new parameters when the table content must be changed, and data selectors. Desired image data conversion, such as gamma correction, masking, etc., can be performed, and conversion characteristics can be easily confirmed.

15 Claims, 5 Drawing Sheets

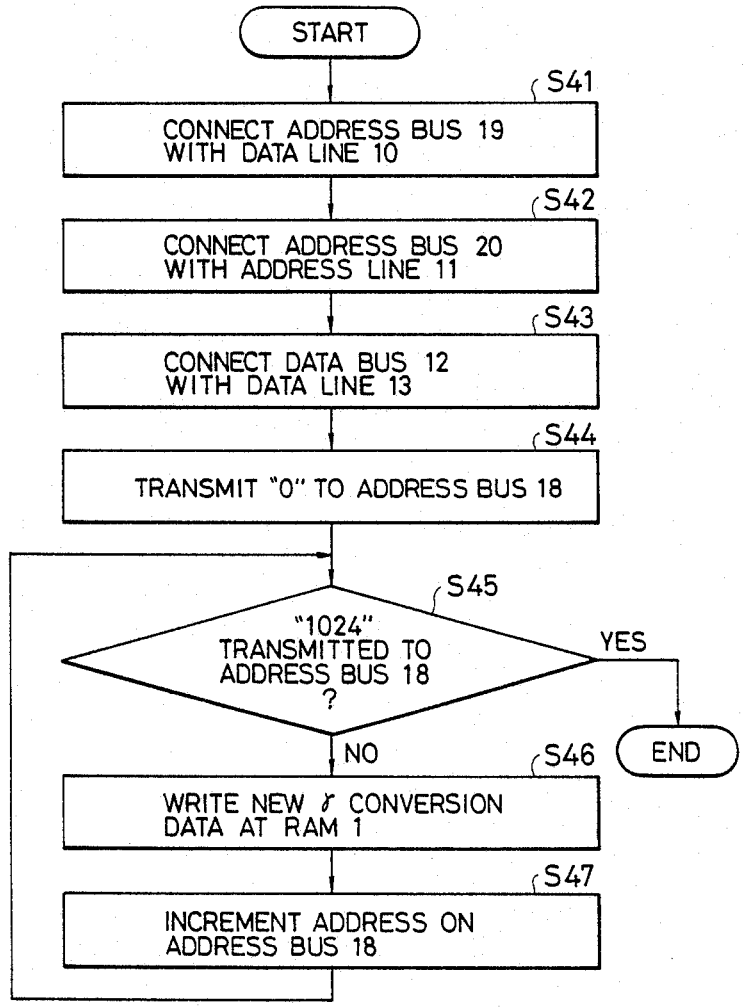

IMAGE DATA CONVERSION SYSTEM

This application is a continuation of application Ser. No. 770,770 filed Aug. 29, 1985.

BACKGROUND OF THE INVENTION

1. Field of the Invention

The present invention relates to a system for converting image data and, more particularly, to an image data conversion system suitably adapted in a gamma conversion circuit or the like.

2. Description of the Prior Art

When gamma conversion of image data or the like is performed in a conventional system of this type, a random access memory (RAM) or a read-only memory (ROM) is used. The image data is supplied to the address input of the RAM or ROM, and desired gamma-corrected image data is obtained from data output from the RAM or ROM in accordance with a gamma conversion table stored in the RAM or ROM. When gamma conversion is performed using a RAM, a desired gamma conversion table must be written in the RAM.

However, in order to obtain a desired gamma curve, a complex combination of input devices such as a dither device is required, resulting in high cost. In addition, in order to confirm the data conversion characteristics by the prepared gamma curve, the gamma curve must be read out and analyzed, or a test pattern must be processed using the gamma curve, resulting in poor operability.

SUMMARY OF THE INVENTION

It is an object of the present invention to eliminate the conventional drawbacks as described above.

It is another object of the present invention to provide an improvement in an image data conversion system.

It is still another object of the present invention to provide an image data conversion system capable of performing desired image data conversion with a simple configuration.

It is still another object of the present invention to provide an image data conversion system which allows simple change of characteristics of image data configuration.

It is still another object of the present invention to provide an image data conversion system which allows simple confirmation of image data conversion characteristics.

It is still another object of the present invention to provide an image data conversion system capable of preparing converted data by a simple system configuration.

According to the invention, these objects are attained by providing an image data conversion system in which image data is converted (the conversion including gamma correction, masking, or the like), on the basis of conversion data formed by a means provided for that purpose. The conversion data forming means receives predetermined parameters, forms the conversion data in accordance therewith and writes the conversion data so formed in the means provided for image data conversion. In particular, it may be desirable that the conversion data forming means have a mode, e.g., a test mode, for reading out the conversion data written in the converting means regardless of the exact nature or content of the image data. The image data converting means may also include one or more tables, receiving image data as an address and outputting the stored information as conversion data. An identification signal may be input to identify the color to which image data being input, corresponds, the choice of table being determined on the basis of a received identification signal.

The above and other objects, features and advantages of the present invention will become apparent from the following description and appended claims when taken into consideration together with the accompanying drawings.

BRIEF DESCRIPTION OF THE DRAWINGS

FIG. 9 is a flow chart for explaining the sequence of generating a pseudo-signal (test pattern).

DETAILED DESCRIPTION OF THE PREFERRED EMBODIMENT

Figure 1:
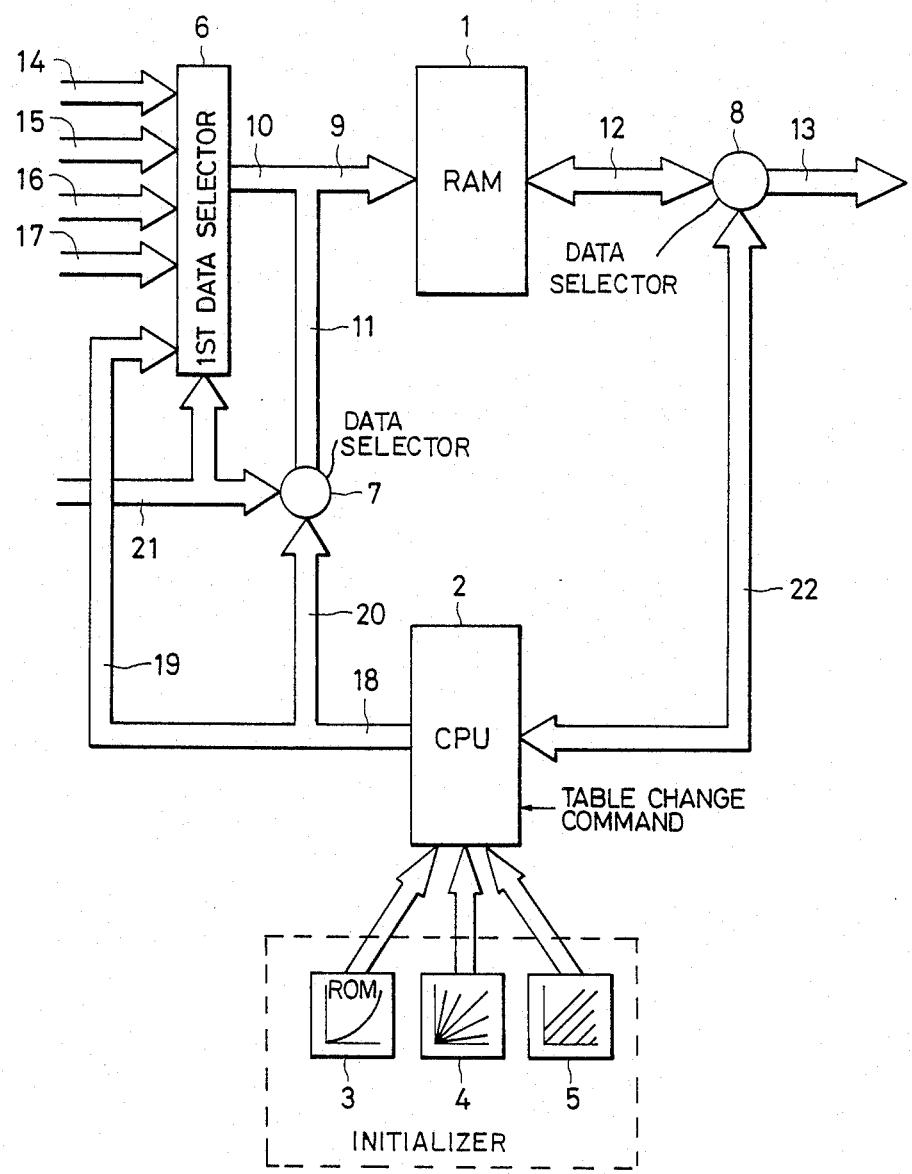
FIG. 1 is a block diagram showing the configuration of a gamma conversion circuit according to an embodiment of the present invention.

FIG. 1 is a block diagram showing the configuration of a gamma conversion system according to an embodiment of the present invention. A RAM (or a group of RAMs) 1 has a 10-bit address line and an 8-bit data line. A CPU (central processing unit) 2 prepares a gamma conversion table in accordance with predetermined parameters to be described later and controls the switching operation between the address and data lines. A nonvolatile ROM 3 provides parameters or data for initializing the RAM 1. Input devices 4 and 5 generate parameters for changing the gamma conversion data prepared in the RAM 1. A first data selector 6 selects image data in accordance with an identification signal and supplies an address sent from the CPU 2 to the address input of the RAM 1. A third data selector 7 switches the control line (address line). A second data selector 8 switches between the gamma conversion data from the CPU 2 and output image data from the RAM 1. A 10-bit address line or data line 9 is connected to the address input of the RAM 1. An 8-bit address line or data line 10 connects the first data selector 6 with the RAM 1 and uses the lower 8 bits of the address line 9. A 2-bit address line or control line 11 is connected to the third data selector 7 and uses the upper 2 bits of the address line 9. An 8-bit data line 12 is connected to the data input of the RAM 1. An 8-bit output data line 13 is connected to the output of the second data selector 8. Four input data lines 14 to 17 correspond to, for example, yellow (Y), magneta (M), cyan (C) and black (K) signals. A 10-bit address bus 18 has the lower 8 bits as an address bus 19 and the upper 2 bits as an address bus 20. A data control line 21 selects one of the input data lines 14 to 17 through the first data selector 6, and is connected to the address line 11 through the third data selector 7. A data bus 22 of the CPU 2 is connected to the second data selector 8. The contents of the ROM 3 can be 1 Kbyte data (gamma conversion data) for initializing the RAM 1 or 8 parameters for preparing 1 Kbyte gamma conversion data (two parameters corresponding to each of the input data lines 14 to 17 for determining the gamma curve of each color).

As will be described later, the CPU 2 prepares gamma conversion data for each color using these parameters, and stores the obtained data in predetermined areas of the RAM 1.

The mode of operation of the system of this embodiments will be described below.

When power is turned on, the CPU 2 initializes peripheral equipment (not shown) by a normal means in accordance with a program. The CPU 2 then receives a first set of parameters ay and by from the ROM 3. The first set parameters ay and by correspond to the input data line 14 (yellow). The CPU 2 controls the first data selector 6 to connect the address bus 19 with the address line 10, and controls the third data selector 7 to connect the address bus 20 with the address line 11 and to connect the address bus 18 of the CPU 2 with the address input of the RAM 1. The CPU 2 then controls the second data selector 8 to connect the data bus 22 with the data input of the RAM 1 through the data line 12. The CPU 2 sets an address "0" on the address line 11 and the address bus 22 constituted by the upper 2 bits of the 10-bit address bus 18, thereby sequentially changing the address of the address line 19 and hence the address line 10 from 0 to 255. At the same time, the CPU 2 transmits onto the data bus 22 and hence onto the data line 12 the gamma conversion data for yellow corresponding to the gamma conversion curve calculated by the CPU 2 from the first set of parameters ay and by by a method to be described later. The data on the data line 12 is written in the lower 256-byte area of the RAM 1 by a known method.

Subsequently, the CPU 2 receives a second set of parameters am and bm from the ROM 3 so as to prepare gamma conversion data for magenta. The CPU 2 sets an address "1" on the address line 20 and the address line 11. The CPU 2 writes gamma conversion data obtained from the second set of parameters in the next 256-byte area of the RAM 1. The CPU 2 receives a third set of parameters ac and bc from the ROM 3, and prepares gamma conversion data for cyan. The CPU 2 sets an address of "2" on the address line 20 and the address line 11, and similarly writes gamma coversion data obtained from the third set of parameters in the next 256-byte area of the RAM 1. The CPU 2 receives a fourth set of parameters ak and bk from the ROM 3 and prepares gamma conversion data for black. The CPU 2 sets an address of "3" on the address line 20 and the address line 11, and similarly writes gamma conversion data obtained from the fourth set of parameters in the next 256-byte area of the RAM 1. The CPU 2 then sets the third data selector 7 to connect the control line 21 with the control line 11, and switches the second data selector 8 to connect the data line 12 with the output data line 13. Then, the RAM 1 is disconnected from the CPU 2, and transmits onto the output data line 13 the gamma conversion data corresponding to the address of the RAM 1 which is determined by the input image data signals Y, M, C and K from the input data lines 14 to 17, and the identification signal from the control line 21. In this manner, the first data selector 6 selects one of the input data lines 14 to 17, and becomes the upper part of the address information (the upper 2 bits) of the RAM 1 so as to select one of the gamma conversion tables (aggregates of gamma conversion data) written in the RAM 1 in accordance with the identification signal.

Therefore, when the identification signal supplied onto the control line 21 is, for example, "1", the input data line 15 (image data signal M) is connected to the data line 10, and the image data signal M is "0 to 255" practically becomes "256 to 511" on the data line 9. Thus, the image data signal M is data-converted by the second gamma conversion table stored in the RAM 1 and is transmitted onto the output data line 13.

However, gamma conversion of all the input signals to the input data lines 14 to 17 may not always provide an optimum result. For example, the input devices 4 and 5 are used when the third gamma conversion table stored in the addresses 512 to 767 in the RAM 1 corresponding to cyan (C) image is to be changed. The input devices 4 and 5 are used to generate predetermined parameters to prepare a new gamma curve (gamma conversion table). When, for example, a table change command is supplied to the CPU 2 and a new set of parameters ac' and bc' for rewriting data at addresses 512 to 767 in the RAM 1 corresponding to the cyan image are supplied to the CPU 2 from the input devices 4 and 5, the CPU 2 controles the data selectors 6 to 8 so as to connect the address bus 19 with the data line 10, the address bus 20 with the control line 11, and the data bus 22 with the data line 12. Then, the CPU 2 sets address data on the address bus 20 at "2" so as to sequentially change the address of the address bus 19 from 0 to 255 and to provide the address data on the data line 9 to the address input of the RAM 1 as 512 to 767. At the same time, the CPU 2 calculates new gamma conversion data in accordance with the parameters ac' and bc' supplied from the input devices 4 and 5, and sequentially writes the data at designated addresses of the RAM 1. When this write operation is completed, the data selector 7 connects the control line 21 with the control line 11 and the data selector 8 connects the data line 12 with the output data line 13. The control lines such as the chip enable line or read/write line of the RAM 1, the chip enable line, the address line and the lead line of the ROM 3, and the address lines and interrupt lines of the input devices 4 and 5 are connected in a known manner and connections of these lines are not particularly illustrated in this embodiment.

The change operation of the gamma conversion table will be described below.

As described above, in this embodiment, two parameters are required to change a gamma conversion table of one color, and the two parameters are generated by the ROM 3 or the input devices 4 and 5.

Figure 2:
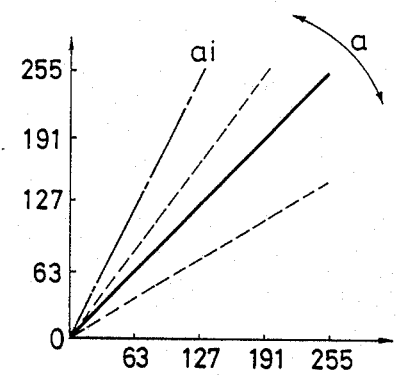
FIGS. 2 and 3 are graphs showing input parameters for gamma conversion data change.
Figure 3:
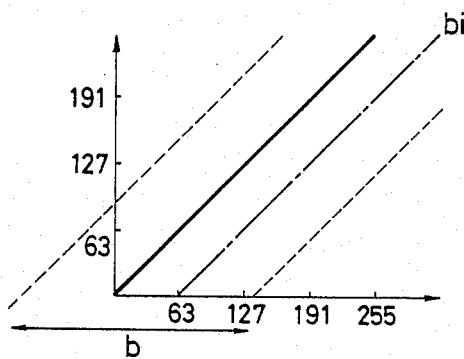

When given parameters ai and bi (FIGS. 2 and 3) are supplied from the input devices 4 and 5, the following equation is determined:

$$Y_i = a_i(X_i - b_i) \tag{1}$$

where $X_i$ is image data supplied to the RAM 1 as an address and satisfies $0 \leq X_i \leq 255$.

Subsequently, the CPU 2 calculates gamma conversion data Table(d) Table (d)=0–255 by the following equation (2) using $Y_i$ calculated by equation (1):

$$\text{Table}(d) = \tag{2}$$

-continued $$\left\{ \frac{1}{n + \left(\frac{(n+3)}{2}\right) - \left(\frac{n}{2}\right)} \times \sum_{i=\left(-\frac{n}{2}\right)}^{\left(\frac{n+1}{2}\right)} (Y_i) + 0.5 \right\}$$

where

| | |
|---|---|
| $Y_i = a(X_i - b)$ | for $b \leq X_i \leq (255/a) + b$ |
| $Y_i = 0$ | for $X_i < b$ |
| $Y_i = 255$ | for $X_i > (255/a) + b$ |
| $Y_i = -ab$ | for $X_i < 0$ and $b < 0$ |

Figure 4:
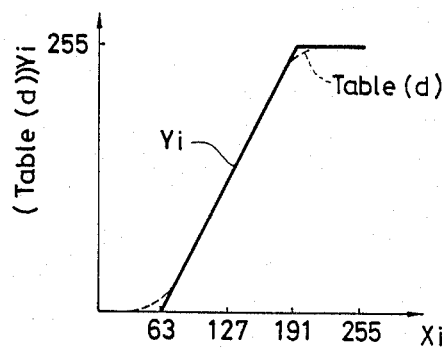

FIG. 4 shows an example when gamma conversion data 0 to 255 for parameters $a=2$ and $b=63$ are calculated by equations (1) and (2). Note that $n=9$ in equation (2) in this case.

Figure 5:
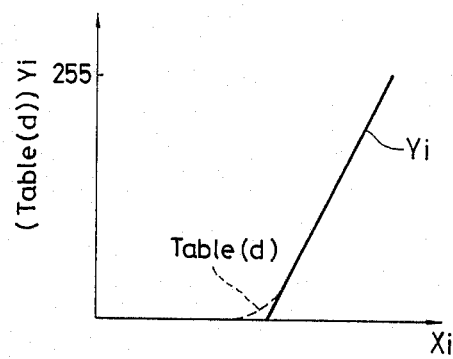
FIGS. 4, 5 and 6 graphs showing gamma conversion data characteristics.
Figure 6:
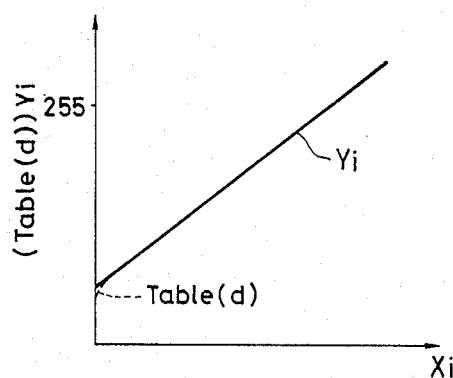

FIGS. 5 and 6 show gamma curves calculated in a similar manner, wherein solid lines represent $Y_i$, broken lines represent Table(d), the axis of abscissa represents the table number (input image data $X_i$) 0 to 255, and the axis of ordinate represents the gamma conversion value.

Table 1 below shows the respective values when $a=2$, $b=63$ and $n=9$ and $0 \leq X_i \leq 255$.

TABLE 1

| $X_i$ | $Y_i$ | Result Obtained by Equation (2) | Table(d) |
|---|---|---|---|
| 0 | 0 | 0 | 0 |
| 1 | 0 | 0 | 0 |
| . | . | . | . |
| . | . | . | . |
| 58 | 0 | 0 | 0 |
| 59 | 0 | 0.18 | 0 |
| 60 | 0 | 0.55 | 1 |
| 61 | 0 | 1.09 | 1 |
| 62 | 0 | 1.82 | 2 |
| 63 | 0 | 2.73 | 3 |
| 64 | 2 | 3.82 | 4 |
| 65 | 4 | 5.09 | 5 |
| 66 | 6 | 6.55 | 7 |
| 67 | 8 | 8.18 | 8 |
| 68 | 10 | 10 | 10 |
| . | . | . | . |
| . | . | . | . |
| 186 | 246 | 246 | 246 |
| 187 | 248 | 248 | 248 |
| 188 | 250 | 249.81 | 250 |
| 189 | 252 | 251.09 | 251 |
| 191 | 254 | 252.18 | 252 |
| 192 | 255 | 253.09 | 253 |
| 193 | 255 | 253.82 | 254 |
| 194 | 255 | 254.36 | 254 |
| 195 | 255 | 254.73 | 255 |
| 196 | 255 | 254.90 | 255 |
| . | 255 | . | . |
| . | . | . | . |
| 254 | 255 | 255 | 255 |
| 255 | 255 | 255 | 255 |

A method of outputting the contents (Table(d)) of the gamma conversion table stored in the RAM 1 in the test mode will be described.

The CPU 2 controls the first and third data selectors 6 and 7 so as to connect the address bus 18 with the address input of the RAM 1. The CPU 2 then controls the second data selector 8 to connect the data line 12 of the RAM 1 with the output data line 13. Thereafter, in a known manner, the CPU 2 transmits all the address data 0 to 1023 onto the address bus 18. At this time, all the contents of the RAM 1 are transmitted onto the output data line 13.

When the obtained image data is subjected to processing such as dither processing and printed out by a dot printer or the like, the contents of the RAM 1 can be easily confirmed.

Preparation and output preparation of the gamma conversion table will be described with reference to the flow chart shown in FIG. 7.

The flow chart in FIG. 7 and those shown in FIGS. 8 and 9, to be described later, are stored as programs in a ROM (not shown) connected to the CPU 2.

Figure 7:
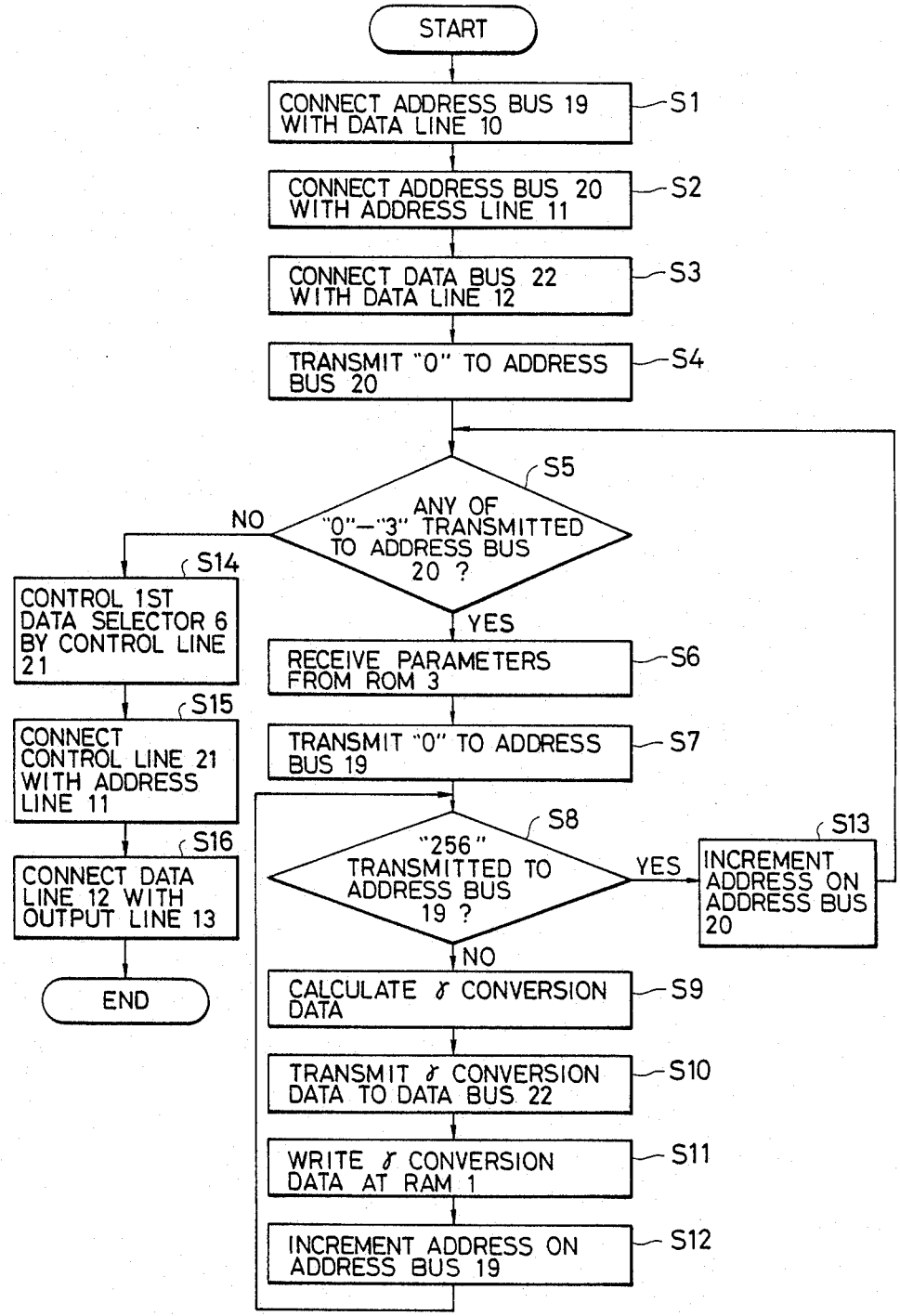
FIG. 7 is a flow chart for explaining the sequences of preparing a gamma conversion table and of output preparation.
Figure 8:
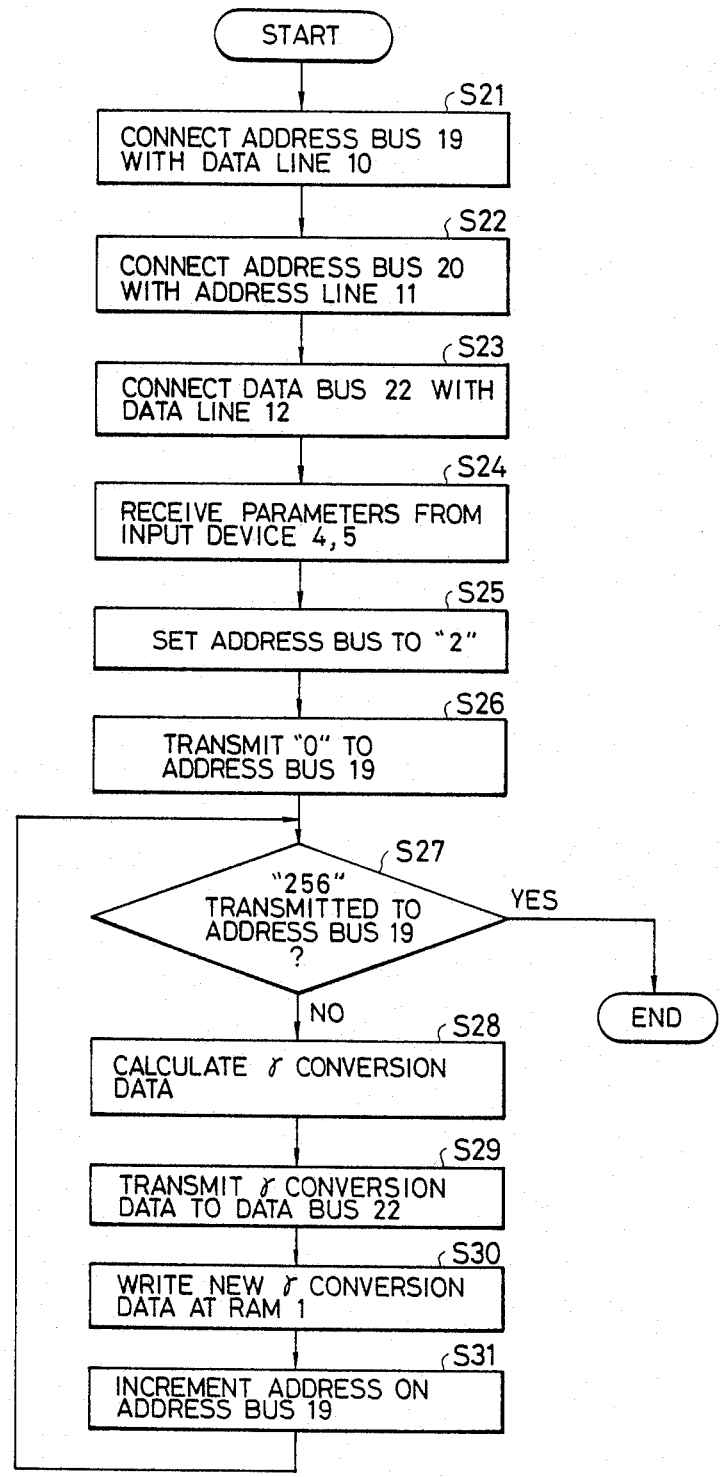
FIG. 8 is a flow chart for explaining the sequence of gamma conversion table change.

S1 to S16 in FIG. 7 respectively represent steps in the sequence.

First, the CPU 2 controls the first data selector 6 to connect the address line 19 with the data line 10 (S1). The CPU 2 controls the data selector 7 to connect the address bus 20 (2 bits) and the address line 11 (2 bits) (S2). The CPU 2 controls the second data selector 8 to connect the data bus 22 with the data line 12 (S3). Then, the CPU 2 transmits an address "0" onto the address bus 20 (S4). The CPU 2 checks if one of "0" to "3" is supplied on the address bus 20 (S5). Since the answer is YES in this case, the CPU 2 receives the set of parameters ay and by from the ROM 3 (S6), and transmits an address "0" onto the address bus 19 (S7). The CPU 2 checks if the address on the address bus 19 is "256" (S8). When NO is the answer in step S8, the CPU 2 calculates the gamma conversion data 0 to 255 (S9), and transmits the gamma conversion data 0 to 255 onto the data bus 22 (S10). The gamma conversion data 0 to 255 is supplied to the data input of the RAM 1 through the data line 12 (S11). The address of the address bus 19 is incremented by "1", and the flow returns to step S8 (S12). However, when the answer YES occurs in step S8, the address of the address bus 20 is incremented by "1", and the flow returns to step S5 (S13). When NO occurs in step S5, the CPU 2 determines that the gamma conversion table has been completely prepared and shifts to the output preparation of the gamma conversion data. First, the first data selector 6 is controlled by the control line 21 (S14). The CPU 2 switches the third data selector 7 to connect the control line 21 with the address line 11 (S15). The CPU 2 switches the second data selector 8 to connect the data like 12 with the output data line 13 (S16), thereby completing output preparation.

As a result, the RAM 1 functions to perform conversion of image data input through the first data selector 6 and operates independently of the CPU 2.

The change operation of the gamma conversion table will be described with reference to FIG. 8. S21 to S31 represent the respective steps of the sequence. The change operation of the gamma conversion table is executed by the CPU 2 in response to a table change command supplied through a density lever (not shown) or the like.

First, the CPU 2 controls the first data selector 6 to connect the address line 19 with the data line 10 (S21), and controls the third data selector 7 to connect the address bus 20 with the address line 11 (S22). The CPU 2 similarly controls the second data selector 8 to connect the data bus 22 with the data line 12 (S23). The CPU 2 then receives parameters, e.g., ac' to bc' for preparing a new gamma conversion curve from the input devices 4 and 5 (S24). The CPU 2 sets the address on the address bus 20 at "2" (S25), and transmits an address "0" onto the address bus 19 (S26). The CPU 2 checks if the address on the address bus 19 is "256" (S27). When NO occurs in step S27, the CPU 2 calculates the gamma conversion data in accordance with the parameters ac' and bc' received in step S24 (S28), and transmits gamma conversion data "0 to 255" onto the data bus 22 (S29). The CPU 2 writes the gamma conversion data calculated in step 28 at addresses 512 to 767 in the RAM 1 (S30). The address on the address bus 19 is incremented by "1", and the flow returns to step S27 (S31). When YES occurs in step S27, the change operation is completed.

Generation of a pseudo-signal (test mode) will be described with reference to the flow chart shown in FIG. 9. Note that S41 to S47 represent steps of the sequence.

First, the CPU 2 controls the first data selector 6 to connect the address bus 19 with the data line 10 (S41), and similarly controls the third data selector 7 to connect the address bus 20 with the control line 11 (S42). The CPU 2 further controls the second data selector 8 to connect the data line 12 with the output data line 13 (S43). The CPU 2 transmits an address "0" onto the address bus 18 to prepare for output of a pseudo signal (S44). The CPU 2 checks if the address on the address bus 18 is "1024" (S45). If the answer is NO in step S45, the CPU 2 sequentially transmits gamma conversion data "0 to 1024" stored in the RAM 1 onto the output data line 13 through the data line 12 (S46). The address of the address bus 18 is incremented by "1", and the flow returns to step S45 (S47). Steps S45 to S47 are repreated to output a pseudo signal (gamma conversion data) from the RAM 1 as if image data is produced therefrom. Meanwhile, when YES occurs in step S45, the sequence of generating a pseudo signal is completed.

In this embodiment, a ROM is used as a unit for generating respective parrameters. However, a battery back-up RAM, a core memory, a magnetic disk or the like may be used instead. When the device 3 for generating parameters is a rewritable volatile memory, desired parameters can be stored in accordance with a command from the CPU 2 in addition to parameters for initialization.

The image data conversion system as described above can be applied to a facsimile system, a digital copying machine or the like. When the system is applied to a digital copying machine, an output from a density layer is supplied to the CPU 2 and the gamma conversion table can be rewritten in accordance with the set density.

The identification signal described above is transmitted together with the image data. When the image data conversion system of the present invention is used for a color digital copying machine, the identification signal is generated in synchronism with scanning for each color by the scanner. The identification signal can be generated in accordance with the switching operation of the filter.

The image data conversion system of the present invention is not limited to a gamma conversion circuit and can be applied to other data conversion systems, e.g., a masking circuit.

The present invention is not limited to the particular embodiment described above, and various other changes and modifications can be made within the spirit and scope of the present invention.

What we claim is:

1. An image data conversion system comprising:
   image data generating means;
   image data converting means for receiving image data generated by said image data generating means and for performing conversion of the received image data; and
   means for forming conversion data for said image data converting means,
   wherein said conversion data forming means receives predetermined parameters, forms conversion data in accordance with the received predetermined parameters, and writes the conversion data in said image data converting means, said conversion data forming means having a mode for reading out the conversion data written in said image data converting means regardless of the image data.

2. A system according to claim 1, wherein said image data converting means receives the image data as an address and performs conversion of the image data using a predetermined table.

3. A system according to claim 2, wherein said image data converting means outputs gamma corrected image data.

4. A system according to claim 1, further comprising parameter generating means for generating the predetermined parameters, wherein said conversion data forming means includes means for performing calculation in accordance with the predetermined parameters to produce the conversion data.

5. A system according to claim 4, wherein said image data generating means generates image data of plural colors and said parameter generating means generates a parameter corresponding to each color.

6. A system according to claim 4, further comprising first connecting means for connecting said image data generating means with said image data converting means, wherein said conversion data forming means switches connection between said image data generating means and said image data converting means into connection between said conversion data forming means and said image data converting means by controlling the first connecting means, when said conversion data is written in said image data converting means.

7. An image data conversion system comprising:
   image data generating means;
   image data converting means for receiving image data generated by said image data generating means and for performing conversion of the received image data; and
   means for forming conversion data for said image data converting means,
   wherein said conversion data forming means receives predetermined parameters, forms conversion data in accordance with the received predetermined parameters, and writes the conversion data in said image data converting means,
   wherein said image data converting means receives the image data as an address and performs conversion of the image data using a table from among a plurality of predetermined tables, and outputs gamma corrected image data, and
   wherein said image data converting means receives an identification signal associated with each color of a plurality of colors, and switches the table to be used for conversion in accordance with the received identification signal.

8. An image data conversion system comprising:
   image data generating means;

image data converting means for receiving image data generated by said image data generating means and for performing conversion of the received image data; and means for forming conversion data for said image data converting means, wherein said conversion data forming means receives predetermined parameters, forms conversion data in accordance with the received predetermined parameters, and writes the conversion data in said image data converting means, wherein said image data converting means receives the image data as an address and performs conversion of the image data using a table from among a plurality of predetermined tables, and wherein said conversion data forming means sequentially generates address data when a table content is changed, and writes newly formed conversion data in said image data converting means to change the table content.

9. An image data conversion system comprising:

means for selecting one of a plurality of kinds of input image data, said selecting means receiving an indication signal representing image data to be selected;

image data converting means for receiving the image data from said selecting means and for performing conversion of the received image data, wherein said image data converting means receives the image data as an address and performs conversion of the received image data using a table from among a plurality of predetermined tables, said image data converting means receiving the indicating signal and switching the table to be used in accordance with the indicating signal; and means for forming conversion data of said image data converting means, said forming means being capable of forming the conversion data relating to each of the tables provided in said image data converting means, wherein said forming means has a mode for reading out the conversion data written in said image data converting means regardless of the image data.

10. A system according to claim 9, wherein said image data converting means receives the image data as an address and outputs gamma corrected image data.

11. A system according to claim 9 wherein the indication signal is a signal associated with each color of a plurality of colors, and said selecting means selects image data of each color in accordance with the indication signal.

12. A system according to claim 9, further comprising parameter generation means for generating predetermined parameters, wherein said conversion data forming means forms conversion data in accordance with said predetermined parameters and writes formed conversion data in said table.

13. A system according to claim 9, wherein said conversion data forming means includes means for performing calculation in accordance with the predetermined parameters to produce the conversion data.

14. A system according to claim 12, wherein said plural types of image data are image data corresponding to plural colors, said tables are arranged correspondingly to the plural colors and said parameter generating means generates a parameter corresponding to each color.

15. An image data conversion system comprising:

image data generating means;

image data converting means for receiving image data generated by said image data generating means and for performing conversion of the received image data; and means for forming conversion data for said image data converting means, wherein said conversion data forming means receives predetermined parameters, forms conversion data in accordance with the received predetermined parameters, and writes the conversion data in said image data converting means;

parameter generating means for generating the predetermined parameters, wherein said conversion data forming means includes means for performing calculation in accordance with the predetermined parameters to produce the conversion data;

first connecting means for connecting said image data generating means with said image data converting means, wherein said conversion data forming means switches connection between said image data generating means and said image data converting means into connection between said conversion data forming means and said image data converting means by controlling said first connecting means, when the conversion data is written in said image data converting means; and outputting means for outputting conversion data from said image data converting means and second connecting means for connecting said image data converting means with said outputting means, wherein said conversion data forming means switches connection between said image data converting means and said outputting means into connection between said image data converting means and said conversion data forming means by controlling said second connecting means, when said conversion data is written in said image data converting means.

* * * * *

UNITED STATES PATENT AND TRADEMARK OFFICE
CERTIFICATE OF CORRECTION

PATENT NO. : 4,805,013

DATED : February 14, 1989

INVENTOR(S) : KATSUHITO DEI, ET AL.

It is certified that error appears in the above-identified patent and that said Letters Patent is hereby corrected as shown below:

COLUMN 7

Line 37, "parrameters." should read --parameters.--.

COLUMN 10

Line 4, "claim 9," should read --Claim 12,--.

Signed and Sealed this

Sixteenth Day of January, 1990

Attest:

JEFFREY M. SAMUELS

*Attesting Officer*   *Acting Commissioner of Patents and Trademarks*